United States Patent [19]
Homestead et al.

[11] 3,722,472
[45] Mar. 27, 1973

[54] METHOD FOR BRANDING ANIMALS

[75] Inventors: Ronald E. Homestead, 2871 South Court, Palo Alto, Calif. 94306; Thomas C. Poulter, Los Altos, Calif.

[73] Assignee: said Homestead, by said Poulter

[22] Filed: May 21, 1971

[21] Appl. No.: 145,707

[52] U.S. Cl. ............................119/1, 101/26, 101/121
[51] Int. Cl. .............................................A01k 29/00
[58] Field of Search ........119/1; 101/14, 26, 30, 129, 101/121

[56] References Cited

UNITED STATES PATENTS

| | | | |
|---|---|---|---|
| 3,379,176 | 4/1968 | Propst | 119/1 |
| 1,869,427 | 8/1932 | Jones | 101/129 |
| 3,180,256 | 4/1965 | Kramer et al. | 101/129 |
| 3,302,563 | 2/1967 | Edwards | 101/114 |

*Primary Examiner*—Aldrich F. Medbery
*Attorney*—Bruce & McCoy

[57] ABSTRACT

A device and method for explosive branding, comprising a formed explosive attached to a block which is pressed against an animal to be branded and detonated in this position to form a mirror image of the formed explosive on the animal.

16 Claims, 11 Drawing Figures

PATENTED MAR 27 1973 3,722,472

INVENTOR.
RONALD E. HOMESTEAD
BY THOMAS C. POULTER

Bruce & Meloy

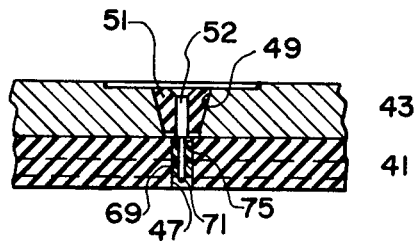
Fig-6
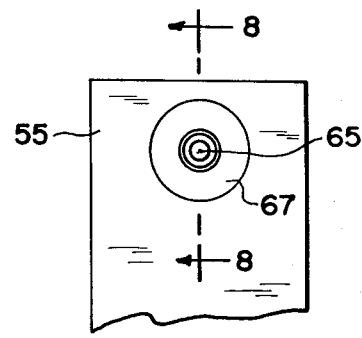
Fig-7
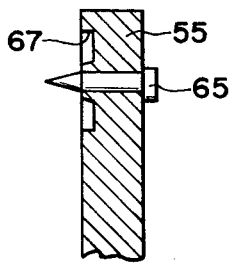
Fig-8
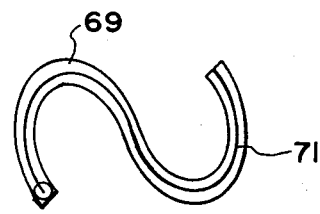
Fig-9
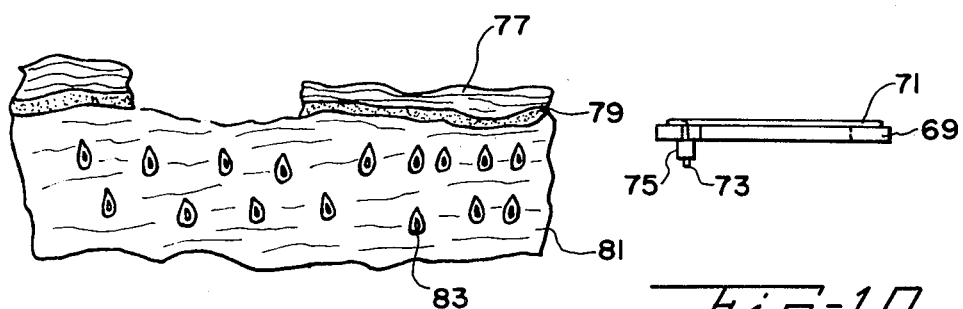
Fig-10
Fig-11
INVENTOR.
RONALD E. HOMESTEAD
THOMAS C. POULTER
BY

METHOD FOR BRANDING ANIMALS

BACKGROUND OF THE INVENTION

1. FIELD OF THE INVENTION

The present invention relates to means for explosive branding and, more particularly, to an explosive device which mechanically abrades the skin of an animal so as to form scar tissue in a predetermined configuration.

2. DESCRIPTION OF THE PRIOR ART

When animals are owned by a person, institution, or the like, or when animals used in scientific studies are allowed to roam about in their natural habitat, some means of identification or marking of the animals to indicate ownership or for identification is required. The most widely used means of identification is the well-known branding of cattle or the like by means of the so-called branding "iron". This is nothing more than a piece of shaped metal attached to a shaft and which is brought to sufficient heat and applied directly against the animal to thereby burn and permanently scar the skin of the animal.

Furthermore, when it is desired to mark an animal which is very hard to trap or control, such animals have been marked by means of a projectile, or staining pellet, fired from a gun at a distance.

The above-set-forth methods of branding or marking animals have the common disadvantage of badly damaging the portion of the animal burned or marked, thereby destroying the skin and subjecting this portion of the animal to the possibility of infection and/or disease. Furthermore, on highly sensitive animals, the above-set-forth means of branding or marking the animal have been known to cause shock and resulting death in the animal because of misapplication and/or inadvertently applying the burn or mark to a highly sensitive portion of the animal.

The present invention overcomes the above-set-forth disadvantages by providing a means for branding by an explosive, which explosive may be mild, to provide thereby a very low impact on the animal, causing a cleaner and better brand, not subject to infection and the possibility of gangrene. Moreover, the present invention will still cause sufficient damage to the tissues of the animal to form a scar, and the hair follicles within the scarred portion will be destroyed to ensure that the branded portion of the animal is not re-covered by any further growth of hair.

The present invention does not apply any appreciable amount of heat to the skin of an animal. The present branding technique is an abrasion of the skin by high velocity gases and finely divided solid particles. The temperature of the skin of the animal being branded is not raised to a point that would produce any lasting effect. The present invention is strictly a mechanical destruction of the hair follicles with sufficient abrasion of the surface of the skin to form scar tissue.

SUMMARY OF THE INVENTION

The present invention is a device for branding animals. It comprises a block having a working surface with a pattern recess formed therein, an actuating means cooperating with an explosive means disposed in the pattern recess, whereby when the block is applied against an animal and actuated, a mirror image of the pattern recess will be formed on the object.

The present invention further contemplates the method of branding animals by the use of an explosive material formed in the mirror image of the shape of the brand to be applied to the animal and by the detonation of the explosive charge when the charge is proximate the hide of the animal.

OBJECTS OF THE INVENTION

It is therefore an important object of the present invention to provide an explosive branding device.

It is another object of the invention to provide a more humane and safer way of branding animals.

It is a further object of the invention to provide a branding device which may have less impact upon the animal but which superficially and permanently abrades the skin of the animal in the area branded.

It is a still further object of this invention to allow the branding of an animal on the head or other sensitive area.

It is still another object of the instant invention to brand an animal by the use of a formed explosive charge held and detonated proximate a portion of the animal.

And yet another object of the present invention is the provision of a method for explosively branding an animal.

DESCRIPTION OF THE DRAWINGS

FIG. 6 is an enlarged cross-sectional view taken along line 6—6 of FIG. 5;

FIG. 7 is a partial front plan view of the actuator block of FIG. 5, showing the firing pin;

FIG. 8 is a cross-sectional view taken along line 8—8 of FIG. 7;

FIG. 9 is a top plan view of a shaped template having a detonating fuse of substantially the same shape secured thereto;

FIG. 10 is the side elevational view of the template of FIG. 9; and

FIG. 11 is a cross-sectional view of the skin of an animal after a brand has been formed therein by the exploding device of the present invention.

DESCRIPTION OF THE PREFERRED EMBODIMENT

Figure 1:
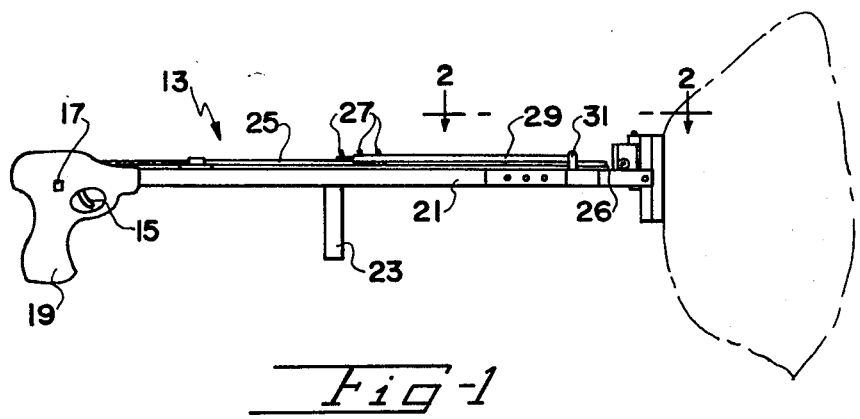
FIG. 1 is a side elevational view of the preferred embodiment of the apparatus of the present invention pressed against an animal to be branded.

The present invention provides a new and novel apparatus and method for the branding of an animal by forming an explosive charge to a predetermined pattern or shape which is a mirror image of the brand to be applied to the animal, holding this predetermined formed charge proximate the portion of the animal to be branded and detonating the explosive charge to form a mirror image thereof on the animal.

Referring now to the drawings, FIGS. 1–10 thereof show the preferred embodiment of the instant invention, comprising a mechanically actuated firing device 13, such as a gun, which may take the form of a modified spear gun. It is, of course, understood that other types of actuators may be used, such as an electrical detonator. However, electrical detonators require permits, restriction of transmitters in the area of use, and many other stringent requirements and procedures associated with their use with explosives. It is therefore believed that with the mechanical type actuator of the instant invention, the branding device will have a wider range of use and will meet all safety requirements required by law.

As seen in FIG. 1, the modified type spear gun 13 includes a trigger 15 having a safety button 17 associated therewith to insure against accidental firing of the gun. The gun includes a handle 19 below the trigger with an elongated barrel 21 extending from the frontal portion of the handle adjacent to the trigger. A further front holding handle 23 is secured to the barrel to enable the gun to be steadied and to enable a user to firmly press the gun against the portion of an animal to be branded. A rod 25, similar to a modified spear, having a front portion or end 26 which is preferably rounded, is mounted over the barrel, and held in place by the trigger. The rod is provided with a plurality of slots 27 whereby a rubber band or sling 29 fixed to the end of the barrel may be hooked into the different slots to vary the force applied to the rod upon release of the trigger.

Figure 2:
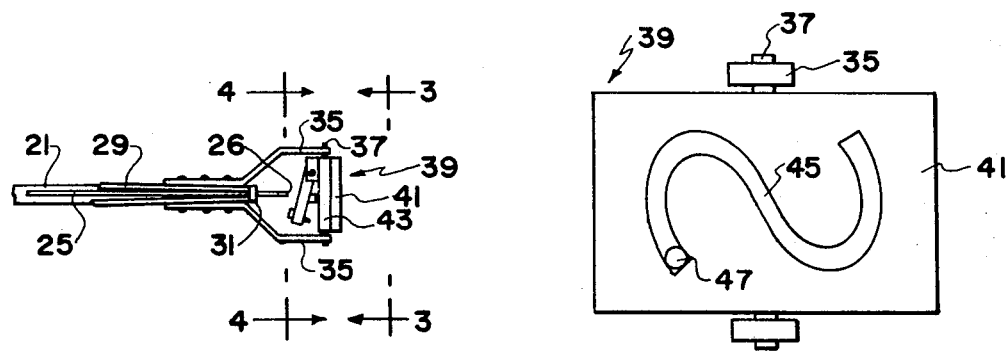
FIG. 2 is a partial top plan view of the branding device shown in FIG. 1.

As shown more clearly in FIG. 2, the end of the barrel is provided with an enclosed collar portion 31 within which the rod glides. The end 26 of the rod extends beyond the end of the barrel for a predetermined distance, depending on the desired movement of the rod when it is released from the trigger.

Two angular brackets 35 are secured to the end of the barrel, extending outwardly therefrom. These brackets may be fixed to the barrel in any convenient manner, such as by nuts and bolts or rivets. The free outward end of each of the brackets is provided with a bore (not shown) extending therethrough whereby a pair of pivot pins 37 fixedly secured to a branding or holding block 39 may be inserted therein so as to pivotably hold the branding block away from, but in alignment with, the end 26 of the rod.

Figure 3:
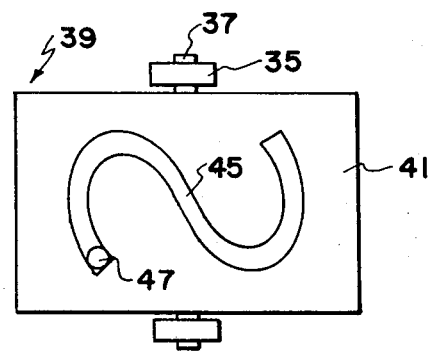
FIG. 3 is an enlarged view of the branding block of FIG. 2, showing the shaped groove formed therein.
Figure 5:
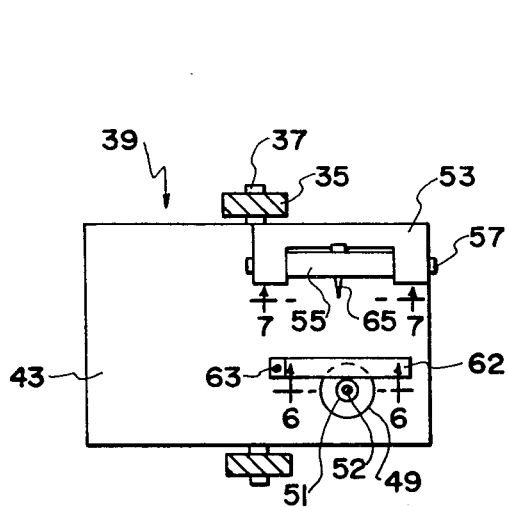
FIG. 5 shows the block of FIG. 4 with the pivotable actuator block in the raised or inoperative position.

As more clearly shown in FIGS. 3–6, the branding block 39 is composed of two separate rectangular plates 41,43 secured together by any suitable means, such as by gluing or by a plurality of screws. The rectangular plate 41 shown in FIG. 3 is preferably constructed from a resilient material, such as molded rubber, and has a groove or pattern recess 45 of a suitable depth formed on the working side thereof, in any convenient manner. This shaped groove is so formed that it is a mirror image of the brand it is desired to apply to an animal. Here, the shaped groove is in the form of a backward or mirror image S, and it is, of course, understood that the invention is not limited to this particular configuration, but also may include several letters or numerals, if required. A bore 47 is formed in one end of the shaped groove, as by drilling, and extends through the entire thickness of the rubber plate (FIG. 6).

Figure 4:
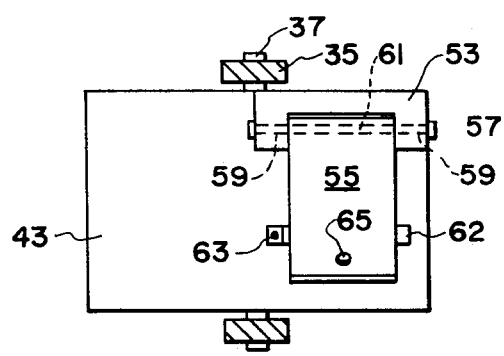
FIG. 4 is an enlarged view, partly in cross-section, showing the back of the branding block of FIG. 2 with the pivotable actuator in the operative position.

The other, or second, plate 43 of the branding block is preferably formed from a stiff material, such as a metal, to which the pivot pins 37 are secured, in any convenient manner, substantially along the middle thereof. As shown in FIG. 6, this plate is also provided with an enlarged bore 49, in alignment with the bore extending through the rubber plate. The bore 49 may be the same size as the bore 47 shown in the rubber plate but is preferably formed tapering inwardly, as shown, whereby a holder 51 for carrying a detonator or primer 52, such as a commercial grade stab detonator or commercial grade primer, may be held therein. A holding or pivoting block 53 is fixed at the edge of the metal plate in alignment with the bore 49 formed on the other side thereof. This block pivotably carries an actuator plate 55 by means of a removable pin 57 extending through a pair of bores 59 formed in the block 53 and a bore 61 in the actuator plate. A leaf spring 62 is secured at one end 63 to plate 43 and the other end thereof is bent upwardly, away from the plate to bias the actuator plate 55 away from contact with plate 43 in the operative position (FIG. 4).

The actuator plate carries a removable firing pin 63 so positioned therein that when the actuator plate is in its lowered or operative position (FIG. 4), the firing pin is aligned with the detonator or primer held within the holder, but held from contact therewith by leaf spring 62. A collection area 67 is formed around the firing pin (FIGS. 7 and 8). The collection area 67 is provided to catch any fragments of material released when the firing pin fires a low impact type detonator. As set forth above, the detonator is preferably of the commercial grade stab type normally covered with a sheet of plastic foil, which foil, upon actuation and explosion of the detonator by the firing pin, is caused to fragment. The collection area is therefore provided to prevent any undesired scattering of these fragments. If a high impact type plastic detonator were used, no groove would be needed since the fragments would stick to the firing pin or to the metal portion of the actuator plate surrounding the firing pin.

FIGS. 9 and 10 show a pattern or template 69, corresponding to the mirror image S formed in the rubber plate. The brand template may, of course, be of any shape and should be formed of a material which is easily disintegrated, such as cardboard or light plastic. An explosive material formed as a core or fuse 71 and having substantially the same shape as the formed template is secured along the central portion of the template. The fuse may be secured to the cardboard in any suitable manner, such as by gluing, and is preferably a mild detonating fuse (MDF) or a special aluminum sheathed explosive. In a preferred embodiment, the fuse is a lead or aluminum covered explosive with the core made of PETN. This explosive is commercially available, and contains two grains per foot of PETN, which is aliphatic nitrate formed as tetragonal crystals. Other explosives, including RDX (cyclotrinethylenetrinitramine) or HMX (homocyclonite) could also be used.

As shown in FIG. 10, the end 73 of the fuse 71 preferably extends over one end of the template and is provided with a resilient holding block 75, such as rubber, of substantially the same diameter as the bore 47 formed in the end of the shaped groove. The lead core of the fuse protrudes slightly from the rubber block to facilitate the detonation thereof, as explained more clearly hereinafter.

OPERATION

The template 69 having the explosive secured thereto is inserted into the pattern recess formed in the rubber plate of the branding block by inserting the rubber block 75 secured over the extending portion of the fuse into the bore and pressing the bottom of the template firmly into the groove with the explosive fuse 71 facing outwardly. The groove is of such a depth that the template and explosive secured thereto are entirely contained within the groove with the explosive 71 being spaced slightly inwardly from the face of the plate 41. Therefore, when the resilient plate 41 is pressed against an animal, the explosive charge is not in contact therewith. There is therefore provided a necessary small space or standoff distance (see FIG. 6) to allow gases and finely divided particles, produced by the exploding fuse, to be accelerated to a sufficiently high velocity to abrade the hide or skin of an animal.

The detonator 52 is then inserted into the detonator holder 51 and secured therein, by any suitable means. The detonator holder is inserted into the bore 49 of the metal plate into contact with the end 13 of the fuse (FIG. 6), and the actuator 55 with the firing pin 65 in place is checked to insure that the leaf spring 62 holds the plate away from the firing pin, to prevent inadvertent firing of the detonator before the device is to be used. The actuator rod 25 of the gun is then brought into contact with the trigger, the safety button is engaged and the actuator block aligned with the end 26 of the rod. The rubber band 29 is positioned or hooked into the desired slot 27 formed on the rod and the explosive branding device is ready for use. The safety button should not be released until an animal has been approached. The rubber side of the pivotable branding block, having the mirror image explosive template held therein, is firmly placed against the portion of the animal to be branded, with the explosive proximate the hide of the animal. The safety button is then released with the device firmly pressed against the animal to insure that the entire groove or recess is against the animal, but that the surface of the explosive is slightly spaced from the animal to be branded. The trigger is then pulled, firing the device and branding the animal by the resulting explosion.

It should be noted that it is extremely important that the pressure against the animal be firm and that the surface of the rubber block be in substantial contact with the animal before firing to obtain a clear and easily discernible brand.

As shown in FIG. 11, after the brand has been formed on the animal, there is only superficial damage to the skin extending through the keratin 77 and into the epithelium 79, which should scar over to from the brand. Since the abrasion of the hide or skin of the animal is as shallow as it is, even the brand area of the hide or skin is not spoiled and is still usable for leather or the like. The brand would, of course, show on the surface of the leather, but unlike the normal hot iron brand, the brand area is not destroyed and is still usable. The metal casing of the explosive core or PETN vaporizes into microscopic particles upon detonation, whereby the metal particles bombard the connecting tissues (81) between the hair follicles 83, adding very significantly to the hair follicle destruction. The above will insure that sufficient damage is caused to the tissue of the animal to form the scar and that the hair follicles within the scar portion will be destroyed to insure that no further growth of hair will take place to re-cover the scarred portion.

By utilizing an MDF or aluminum covered core, the present invention may be operated with a very low impact on the animal, as low as 2 foot/pounds. This light impact further allows the present device to be used to brand sensitive animals, or sensitive portions of an animal not heretofore capable of being branded. In this manner, the head of an animal, such as a steer, may be branded on the frontal top portion, thereby reducing even further the amount of marking of the usable hide.

It is therefore an important advantage of the present invention that it provides a novel apparatus and method for branding animals which may be used to brand previously unbrandable parts of the animal or animals previously considered too sensitive to brand and which eliminates the previous dangers encountered with the branding of animals, such as destruction of the skin, infection and gangrene.

It will be apparent from the foregoing description of the invention in its preferred form that it will fulfil all the objects attributable thereto, and while it is illustrated and described in detail, the invention is not to be limited to such details as have been set forth except as may be necessitated by the appended claims.

What is claimed is:

1. A device for branding animals, comprising, in combination,
    a block having a working surface which is applied to the hide of an animal,
    a pattern recess formed in the working surface of said block,
    an explosive means disposed in and conforming to said pattern recess, and
    actuating means for detonating said explosive means, whereby when said block is applied against an animal to be branded, and actuated, a mirror image of said recess will be formed on said animal by the effect of the resulting explosion.

2. The device of claim 1, including a template having a formed explosive attached thereto which can be disposed in said pattern recess.

3. The device of claim 1, wherein said block is formed of a resilient material.

4. The device of claim 3, wherein said block is molded from rubber and has a side opposite said working surface with a bore extending therebetween, said block being supported by a mechanical actuator, the opposite side of said block from said pattern recess formed on the working side thereof pivotably supporting a firing pin, and a detonator being held in said bore in alignment with said firing pin.

5. The device of claim 4 wherein said mechanical actuator comprises a gun having a trigger with an actuating rod removably attached thereto, said firing pin being capable of alignment with said actuating rod, whereby, upon actuation of said trigger and release of said actuating rod, said actuating rod will be forced into contact with said firing pin.

6. The device of claim 1 wherein said actuating means includes a mechanical actuator in aligned relationship with said block.

7. The device of claim 6 wherein said block is rectangular and has two sides with a bore extending therebetween, said block being pivotably supported by said actuator with a further mechanical actuator, pivotably supported on the other side of said block.

8. The device of claim 7 including a template having substantially the same shape as said pattern recess, said template having a formed explosive attached thereto with a portion of said explosive extending into said bore, said bore supporting an explosive detonator primer, and said further mechanical means comprising a pivoting block having a firing pin supported therein biased away from contact with said plate and which is capable of being pivoted into contact with said detonator primer by actuation of said mechanical actuator to cause said detonator primer to detonate said explosive.

9. The device of claim 1 wherein said block comprises two rectangular plates secured together, one of said plates being made from metal, and the other of said plates being made from rubber, a bore extending through both of said plates, said metal plate including biasing means acting against a pivotably supported actuator block, said pivotable actuator block including a firing pin, and said rubber plate having the pattern recess formed therein for holding said explosive means.

10. The device of claim 9 including a template which is a mirror image of the shape of the brand to be applied to the hide of the animal, having an explosive with substantially the same form as said template secured thereto.

11. The device of claim 10 wherein said actuating means includes a rod mounted on a barrel releasably connected to a trigger, said rod having means biasing said rod toward said pivotable actuator block, whereby, when said trigger is actuated to release said rod, said rod will be forced into contact with said pivotable actuator block against its biasing means to force said firing pin into contact with a detonator held in said bore to detonate said detonator.

12. A device for branding animals, comprising, in combination,
 a gun, having an elongated barrel with a free end supporting an actuator rod, said actuator rod being releasably connected to a trigger and having an actuating means capable of being adjustably attached thereto for biasing said rod away from said trigger;
 a pair of brackets adjustably secured to the end of said gun barrel;
 a rectangular branding block pivotably supported between said brackets, said branding block being constructed from a metal pad having a rubber pad secured to one face thereof, said metal pad having a metal plate pivotably supported on its unattached face, said metal plate being spring-biased away from said metal pad and removably carrying a firing pin therein, a bore extending between the unattached faces of said pads, said bore supporting a detonator primer in alignment with said firing pin, said rubber pad having a hollow groove formed on its unattached face; and
 a cardboard template having substantially the same shape as said hollow groove formed in said rubber pad releasably secured within said hollow groove, said template having a detonating fuse the same shape as said template secured thereto with a portion of said fuse extending into said bore, whereby, when said branding block is applied against an animal and said actuating rod is released by said trigger, said biasing means forces said rod into contact with said pivotable plate to force said firing pin into contact with said detonator primer to detonate said detonating fuse to thereby form a brand on said animal by the resulting explosion.

13. A template for use in branding animals comprising,
 a pattern having a shape which is a mirror image of the brand to be applied to the hide of the animal, and
 a detonating fuse having substantially the same shape as said pattern secured to one side of said template, said fuse including a portion capable of being brought into contact with a detonator primer.

14. A branding block for removably supporting a formed explosive capable of branding an animal, comprising,
 a metal block having two sides with a bore extending therethrough,
 an actuator block pivotably mounted on one side of said metal plate,
 a leaf spring having one end thereof secured to said metal plate and being bent to enable the other end thereof to bias said pivotable block away from said metal plate,
 a firing pin adjustably mounted in said pivotable block in alignment with said bore,
 a rubber plate, having two sides, one of said sides being secured to the other side of said metallic plate,
 a bore extending between the sides of said rubber plate in alignment with said bore formed in said metallic plate,
 a detonator holder supporting a detonator primer held in said bore in said metallic plate, and
 said other side of said rubber plate having a groove formed therein, said groove being connected to said bore, whereby, when a template having an explosive attached thereto is inserted into said groove and said bore, said template may be detonated by the detonation of said detonator primer.

15. A method for branding animals comprising the steps of
 a. forming a pattern which is a mirror image of the shape of the brand to be applied to the hide of the animal;
 b. securing a detonating fuse of substantially the same shape to said pattern;
 c. holding said shaped pattern and said detonating fuse proximate the hide of the animal; and
 d. detonating said detonating fuse.

16. The method of claim 15 further including the steps of placing said shaped pattern and said detonation fuse in a pattern recess, having substantially the same shape as said shaped pattern, and detonating said fuse in said recess when said recess is pressed against the hide of an animal.

* * * * *